United States Patent [19]

Lang et al.

[11] 4,033,646

[45] July 5, 1977

[54] ROLLER BEARING WITH ROTATABLE GUIDE CAGE

[75] Inventors: Franz Lang, Stadtlauringen; Erwin Dees, Kutzberg, both of Germany

[73] Assignee: Kugelfischer Georg Schafer & Co., Schweinfurt, Germany

[22] Filed: Mar. 21, 1975

[21] Appl. No.: 560,704

[30] Foreign Application Priority Data

Mar. 21, 1974 Germany ............................ 2413612

[52] U.S. Cl. .................................. 308/218; 308/130; 308/202; 308/187

[51] Int. Cl.² ......................................... F16C 19/00

[58] Field of Search ............ 308/202, 207 R, 207 A, 308/214, 216, 217, 218, 187, 130

[56] References Cited

UNITED STATES PATENTS

| | | | |
|---|---|---|---|
| 991,218 | 5/1921 | Lockwood | 308/218 |
| 1,689,505 | 10/1928 | Styri | 308/218 |
| 1,941,460 | 1/1934 | Boden | 308/218 |
| 3,940,191 | 2/1976 | Tomioka et al. | 308/214 |
| 3,957,319 | 5/1976 | Gorski | 308/187 |

*Primary Examiner*—Joseph F. Peters, Jr.
*Assistant Examiner*—Richard A. Bertsch
*Attorney, Agent, or Firm*—Karl F. Ross; Herbert Dubno

[57] ABSTRACT

A journal bearing with two rows of symmetrically inclined rollers on opposite sides of a midplane includes a split cage whose two halves, meeting at that midplane, form crenelations engaging the rollers. The cage is guided along the inner surface of the outer bearing race which is provided with several peripherally spaced radial bores for the admission of lubricant, these bores opening onto a slightly wider inner peripheral groove formed by confronting annular recesses on the adjoining faces of the two cage halves. Burrs surrounding the inner ends of the bores register with the groove and do not interfere with the rotation of the cage.

8 Claims, 2 Drawing Figures

ROLLER BEARING WITH ROTATABLE GUIDE CAGE

FIELD OF THE INVENTION

Our present invention relates to a journal bearing in which two sets of rollers, symmetrically disposed on opposite sides of a midplane transverse to the bearing axis, are received between an inner peripheral surface of an outer race and outer peripheral surface of an inner race and are guided by lateral projections of an annular cage which is bisected by that midplane and rotatably engages of the peripheral bearing surfaces.

BACKGROUND OF THE INVENTION

In order to facilitate relative rotation between the cage and its supporting surface, it is customary to provide the corresponding races with one or more radial bores opening onto the bearing surface thereof to enable the introduction of a lubricant such as oil at the interface between the race and the cage. With bearings rotating at high speeds, e.g. as part of a mechanism for oscillating a screen in the sifting of particulate matter, the centrifugal force tends to accumulate the lubricant along the inner surface of the outer race so that it will be convenient to use that surface for the guidance of the cage.

The machining and truing of the bearing surfaces can easily be done on the cast and hardened races by automatic means. Upon the drilling of the lubricating bore or bores in the outer race, however, the inner end of each bore has a burr which, since the bore registers with the contact surface of the cage, must be removed by painstaking reaming and refinishing operations that are time-consuming and expensive.

OBJECTS OF THE INVENTION

The general object of our invention is, therefore, to provide a roller-bearing construction which avoids the aforestated inconveniences.

Another object is to provide means in such a bearing for the storage of a substantial quantity of lubricant at a central location.

SUMMARY OF THE INVENTION

We realize these objects, in accordance with our present invention, by providing the annular cage with a peripheral groove wider than the lubricating bore or bores and in continuous communication therewith, the groove thus facing the peripheral surface of the radially perforated (normally the outer) race.

BRIEF DESCRIPTION OF THE DRAWING

The above and other features of our invention will now be described in detail with reference to the accompanying drawing in which.

SPECIFIC DESCRIPTION

Figure 2:
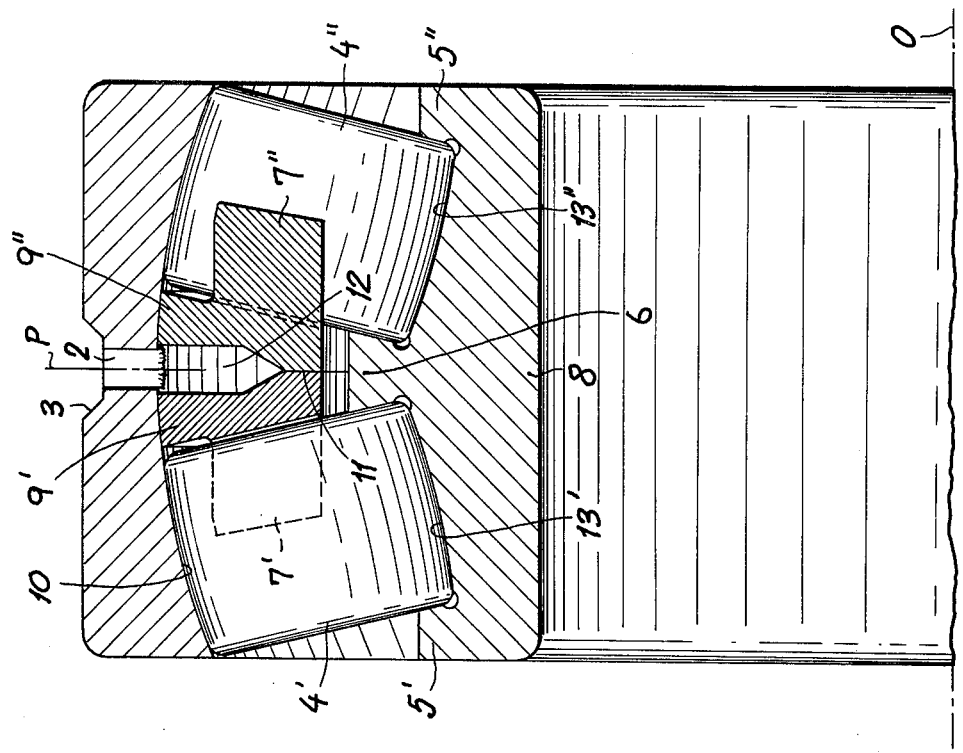
FIG. 2 is a cross-sectional view taken on the line II—II of FIG. 1.
Figure 1:
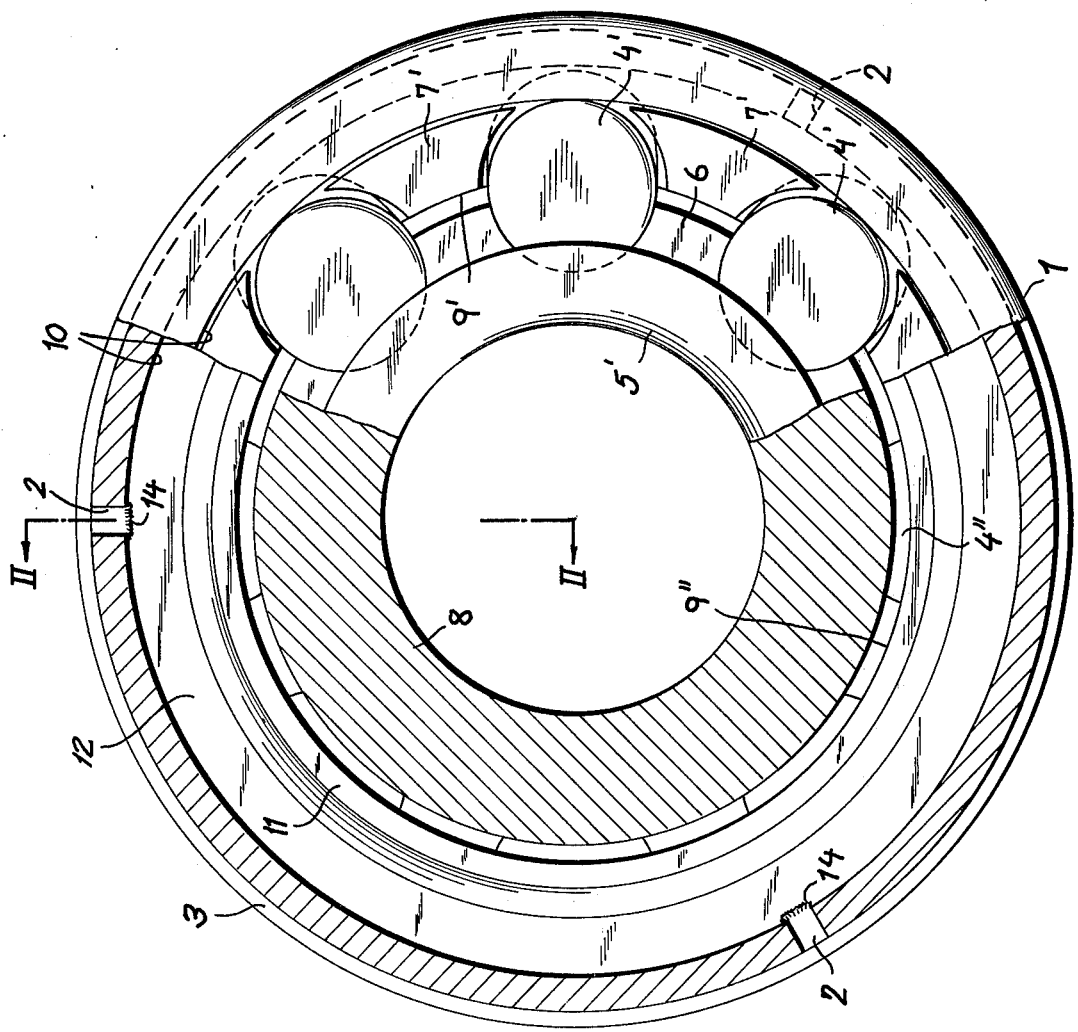
FIG. 1 is a side view (with parts broken away) of a roller bearing embodying our invention.

The bearing shown in the drawing comprises a pair of concentric rings with an axis O and a transverse midplane P, i.e. a ring 1 with an inner peripheral surface 10 of toroidal shape forming an outer race and a ring 8 with an outer peripheral surface forming an inner race, the latter surface being divided by three ridges 5', 5" and 6 into two annular guide grooves 13', 13" to accommodate respective sets of rollers 4', 4" contacting the toroidal surface 10. The rollers 4' and 4" diverge radially outwardly from the midplane P and bracket a split guide cage whose two solid annular halves 9', 9" have annular faces 11 adjoining each other along midplane P. These annular faces are formed with confronting recesses defining a peripheral groove 12 which registers with several (here three) peripherally equispaced radial bores 2 in ring 1, the width of the groove being slightly greater than the diameter of the bores whereby a burr 14 at the inner end of each bore is received within the groove 12 and need not be removed. The bores 2 are interconnected by an external angular groove 3. The groove 12 constitutes a receptacle for lubricant introduced through the bores 2 under a pressure sufficient to overcome the centrifugal force generated by the rotating cage 9', 9"; this centrifugal force helps distributing lubricant over the flanking outer cage surfaces. Cage halves 9' and 9" are provided with laterally extending crenelations 7', 7" which project between the rollers 4' and 4" to maintain their mutual peripheral spacing.

The cage 9', 9", whose cross-section converges inwardly so as to be generally wedge-shaped, is considerably lightened by the presence of groove 12. Splitting it into two halves, which may be subsequently interconnected by any convenient means such as riveting or soldering, simplifies the task of forming the groove 12. The cage and the rollers may be preassembled on the inner ring 8 before being introduced into the outer ring 1, such introduction being facilitated by the fact that the generatrices of surface 10 are curved about the center of the unit, i.e. the intersection of axis O with the plane P.

We claim:

1. A journal bearing comprising:

an inner race with an outer peripheral surface and an outer race with an inner peripheral surface centered on a common axis, said races being symmetrical about a midplane transverse to said axis;

two sets of bearing rollers symmetrically disposed on opposite sides of said midplane in contact with said peripheral surfaces; and an annular cage bisected by said midplane and rotatably guided on said inner peripheral surface, said cage being provided with lateral projections interleaved with the rollers of both said sets, said outer race being provided at said midplane with a radial inlet bore for lubricant, said cage having an outwardly open peripheral groove wider than said bore and in continuous communication therewith, said peripheral groove registering with an end of said bore opening onto said inner peripheral surface.

2. A journal bearing as defined in claim 1 wherein said bore is duplicated at several peripherally spaced locations on said outer race.

3. A journal bearing as defined in claim 2 wherein said outer race has an external annular groove interconnecting the several bores.

4. A journal bearing as defined in claim 1 wherein said sets of rollers diverge in a radially outward direction from said midplane, said cage being of radially inwardly converging cross-section.

5. A journal bearing as defined in claim 4 wherein said cage is split into two annular halves with annular faces adjoining each other along said midplane, said groove being constituted by confronting recesses on said annular faces.

6. A journal bearing as defined in claim 4 wherein said inner peripheral surface has a pair of annular guide grooves receiving portions of the rollers of said two sets, respectively.

7. A journal bearing as defined in claim 6 wherein said inner peripheral surface is toroidal with generatrices curved about the intersection of said axis with said midplane.

8. A journal bearing as defined in claim 7 wherein said end of said bore is surrounded by a burr extending into said peripheral groove.

* * * * *